United States Patent [19]
Lindale

[11] Patent Number: 5,717,564
[45] Date of Patent: Feb. 10, 1998

[54] FUEL PUMP WIRING

[75] Inventor: Adam J. Lindale, Muskegon, Mich.

[73] Assignee: Bennett Pump Company, Spring Lake, Mich.

[21] Appl. No.: 725,933

[22] Filed: Oct. 7, 1996

[51] Int. Cl.[6] .................................................. H02B 1/00
[52] U.S. Cl. .................. 361/600; 137/356; 174/50.52; 361/622; 361/823; 361/826
[58] Field of Search .................. 137/234.6, 356, 137/259, 363; 174/38, 50, 50.52; 361/600, 622, 641, 823, 826

[56] References Cited

U.S. PATENT DOCUMENTS 5,134,541  7/1992  Frouin ...................................... 761/622

Primary Examiner—Gregory D. Thompson
Attorney, Agent, or Firm—Van Dyke, Gardner, Linn & Burkhart, LLP

[57] ABSTRACT

A fuel dispenser includes a housing, a compartment in the housing, electrical controls and a terminal device in the compartment and a fixture extending into the compartment. The fuel dispenser is field-installed by connecting an external conduit to the housing and running unbroken electrical leads through the external conduit and the fixture. The electrical leads are terminated at the terminal device and the fixture is sealed against vapor transmission.

23 Claims, 3 Drawing Sheets

FUEL PUMP WIRING

BACKGROUND OF THE INVENTION

This invention relates to a vehicle fuel dispenser and method of installing such fuel dispenser, in particular, the invention relates to an apparatus and method for making electrical interconnections with a fuel dispenser.

Fuel dispensers, in general, and self-sere fuel dispensers, in particular, have grown in complexity. Such dispensers are now available with means to accept various forms of payment directly from the customer including, but not limited to, credit card readers, currency acceptors, and the like. The conventional self-serve fuel dispenser has always been a complex apparatus and has become even more complex with the addition of micro-electronic controls and sophisticated mechanical mechanisms required to support the additional functions described above. This complexity has made the fuel dispenser difficult and costly to manufacture and extremely cumbersome to service.

One area of expense and complexity in a fuel prop is the terminal box for making electrical interconnection with field wiring. A fuel pump is typically divided into two compartments. One compartment, containing the electrical and electronic controls, is isolated from sources of fuel vapors. Therefore, such compartment does not require explosion-proof rated fixtures. The other compartment typically includes fuel-handling mechanisms, such as meters and the like. Because such fuel-handling equipment is capable of emitting fuel vapors, which are explosive, all equipment in this second compartment must be rated under suitable explosion-proof standards, such as Class 1, Division 1, ratings.

Electrical service in the field is traditionally brought into a compartment which is rated Class 1, Division 1 explosion hazard. In order to provide electrical field interconnections with such fuel dispenser, the fuel dispenser includes a terminal box in the compartment connected to the underground conduit. Became such compartment must be rated Class 1, Division 1 fuel hazard rating, such terminal box must, itself, be rated against being a source of ignition for such fuel vapors. This has required a heavy casting for the box and a cover which is applied to the box and sealed by a metal-to-metal face seal. The box typically includes a terminal strip and a threaded opening for connection with the underground conduit. Another conduit leads from the terminal box across a fuel vapor barrier into the compartment containing the electrical and electronic controls. Wires from the electrical and electronic controls lead through this conduit into the explosion-proof terminal box.

Because of its exceptional cost and difficulty to manufacture, it would be desirable to eliminate the explosion proof terminal box.

SUMMARY OF THE INVENTION

The present invention provides a vehicle fuel dispenser and a method of field-installing such dispenser which eliminates the need for an explosion-proof terminal box. This is accomplished in a manner which may reduce the hazard of fuel vapor ignition defined by removing electrical interconnections from fuel vapor areas.

A fuel dispenser, according to the invention, includes a housing having a compartment defined by a wall and electrical controls positioned in the compartment. A wiring system is provided which includes a terminal device in the compartment electrically connected to the controls. An electrical fixture penetrates the wall. A vapor-impermeable seal is in the fixture, thus preventing fuel vapors from entering the control compartment. In this manner, field-installed wires may pass unbroken from the underground conduit to the terminal device. In order to further avoid transfer of fuel vapors between compartments, a second vapor-impermeable seal may be provided where the fixture penetrates the wall. The seal may include a potting fixture, which may be field-installed, and potting compound in the fixture. Alternatively, the seal may be a foam seal, a vacuum seal, a preformed rubber seal, or the like. Because the terminal device is located in the compartment for the electrical and electronic controls, which is itself not rated against fuel vapor explosion, it is not necessary that the terminal device be sealed in an explosion-proof box. Accordingly, the cost and complexity is significantly reduced.

A method of field-installing a fuel dispenser according to the invention includes providing a fuel dispenser having a housing, a compartment in the housing, electrical controls and a terminal device in the compartment, and a fixture penetrating the compartment wall. The method further includes running unbroken electrical leads through the fixture and terminating the leads with the terminal device. The invention further includes sealing the fixture against vapor transmission.

These and other objects, advantages, and features of this invention will become apparent upon review of the following specification in conjunction with the drawings.

DESCRIPTION OF THE PREFERRED EMBODIMENT

Figure 1:
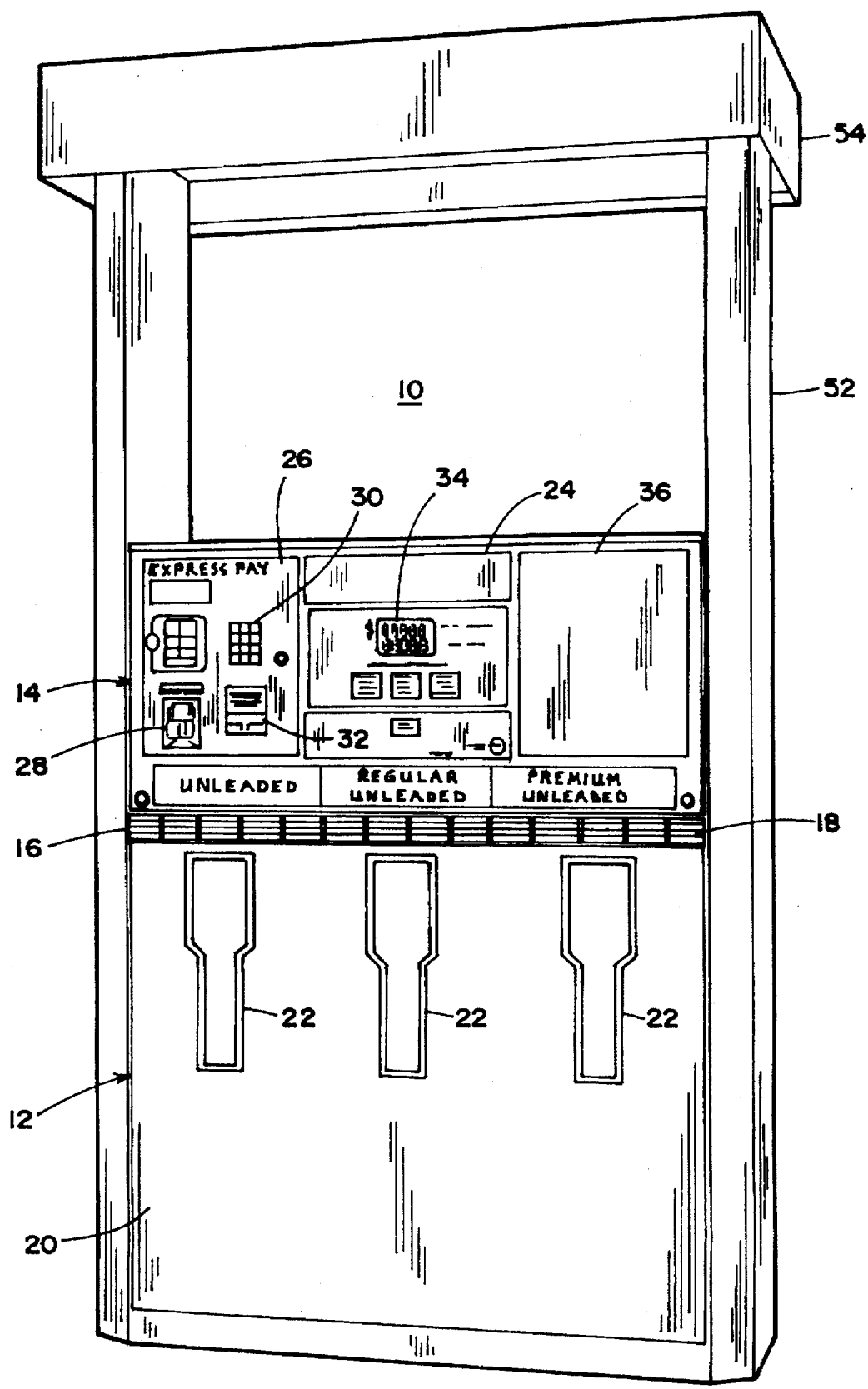
FIG. 1 is a front perspective view of a fuel dispenser according to the invention.
Figure 2:
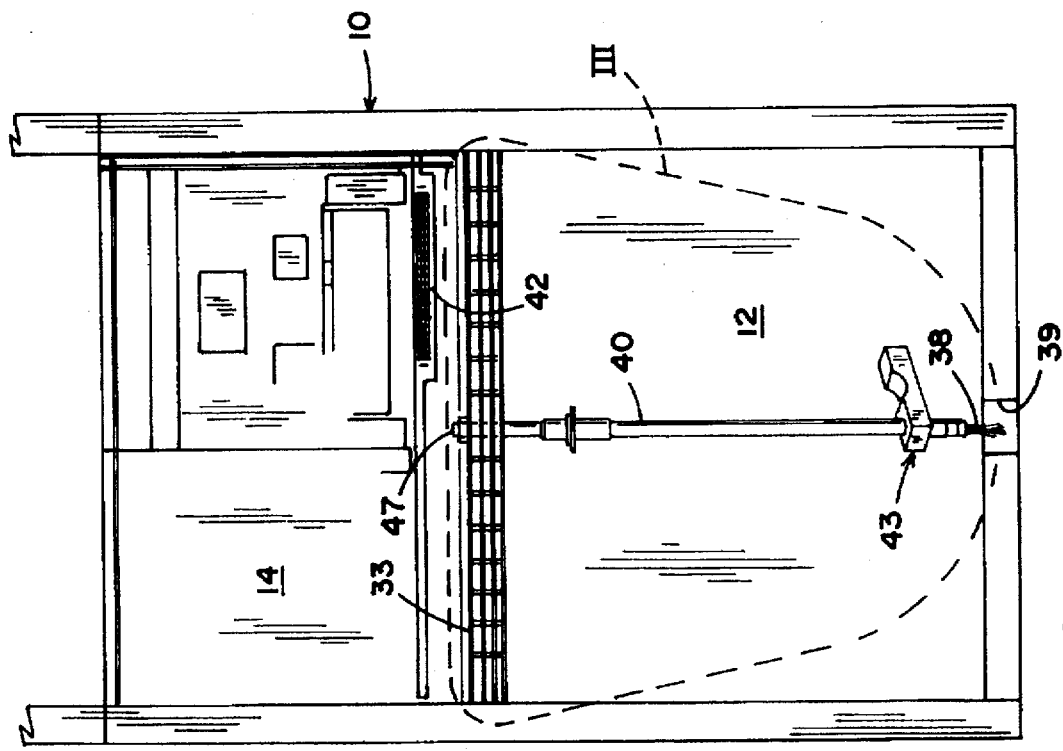
FIG. 2 is a front elevation of the fuel dispenser in FIG. 1 with covers removed in order to reveal internal components thereof.
Figure 4:
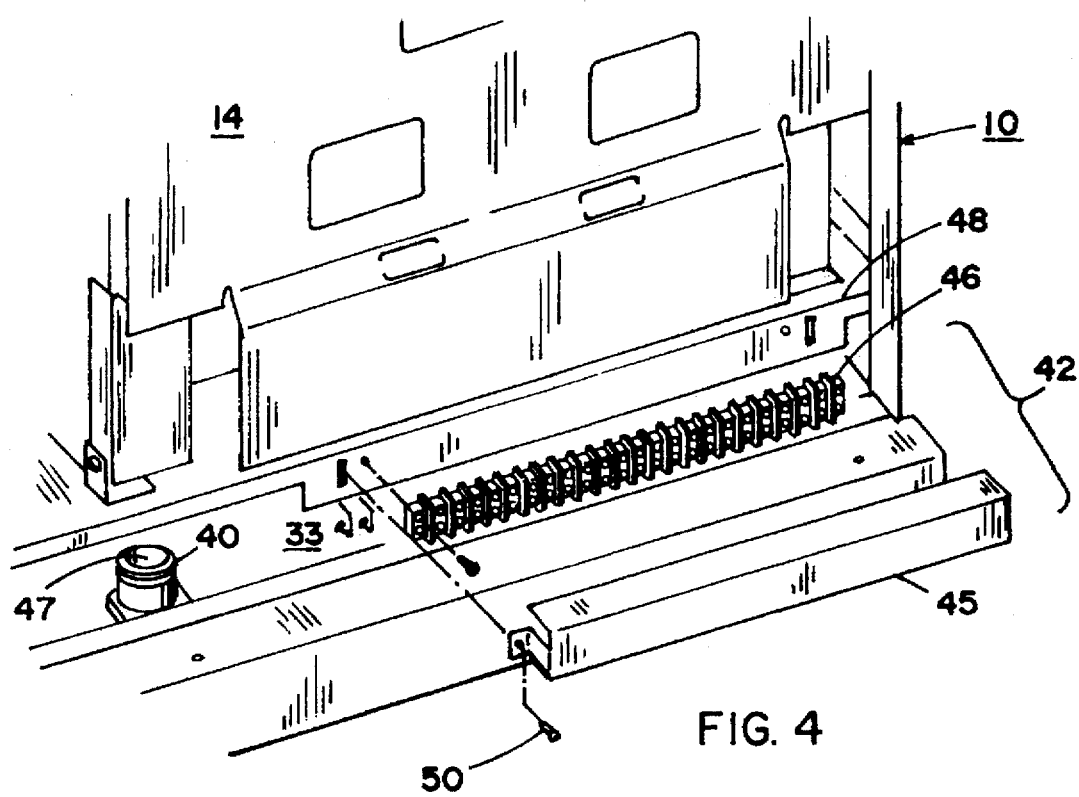
FIG. 4 is an exploded perspective view of the area designated IV in FIG. 3.
Figure 3:
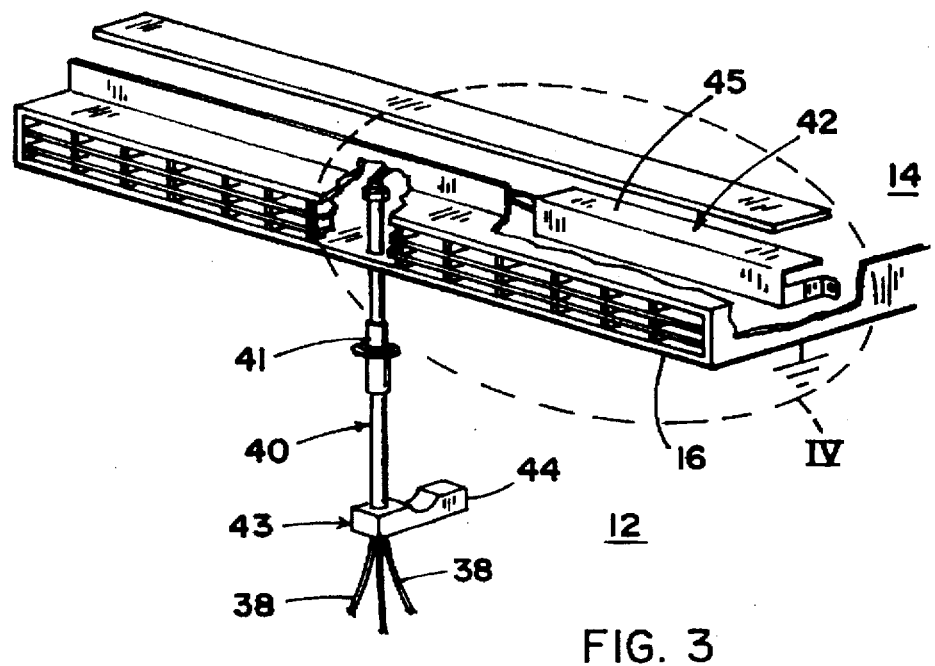
FIG. 3 is a perspective view of the area designated III in FIG. 2.

Referring now specifically to the drawings and the illustrative embodiments depicted therein, a fuel dispenser 10 includes a fuel-handling compartment 12 on a lower portion thereof and a control compartment 14 on an upper portion thereof. As is conventional, compartments 12, 14 are separated by a vapor barrier 16 which, in the illustrated embodiment, is an air gap covered by a grill 18 (FIGS. 1 and 2). Fuel-handling compartment 12 is accessible by opening a cover 20, which includes thereon a plurality of boots 22 for supporting nozzles (not shown) in a rest position. Control compartment 14 includes a front panel 24 having a payment panel 26, including a credit card acceptor 28, a keypad 30, and a cash acceptance assembly 32. Front panel 24 additionally includes a display panel 34 which provides information to the user regarding unit price, total sale, and the like. Front panel 24 may additionally include a video display monitor 36 for displaying messages and the like to the user.

Fuel-handling compartment 12 is referred to a Class 1, Division 1, environment because of the presence of fuel-handling apparatus (not shown), such as meters and the like, requiring that equipment therein be enclosed in a manner to avoid ignition of fuel vapors. In order to terminate wires 38 connected to a central control unit (not shown) through an underground conduit (not shown) through an opening 39, a fixture or conduit 40 is shown extending through vapor barrier 16 and penetrating a wall 33 of compartment 14 to a position adjacent a terminal device, such as a terminal box 42, in control compartment 14. A vapor-impermeable seal 43 is provided at the lower end of conduit 40 within fuel-handling compartment 12. Vapor-impermeable seal 43 prevents the passage of fuel vapors through fixture 40 into control compartment 14.

In the illustrated embodiment, vapor-impermeable seal 43 is a potting boot 44 which may be installed either in the factory or in the field on a lower end of fixture 40 and filled with potting compound after electrical interconnections are made. When such potting boot 44 is filled with a potting compound, wires 38 extend to terminal device 42 while sealing fixture 40 against the passage of fuel vapors. Terminal device 42 includes a terminal block, or strip, 46 which is covered by a removable cover 45. Cover 45 may be pivotally mounted 43 to bracket 48, which mounts terminal block 46 and/or may be attached by fasteners such as screws 50. Because terminal device 42 is located in compartment 14, which is substantially free of fuel vapors, terminal device 42 does not need to be explosion-proof rated. In the illustrated embodiment, fixture 40 is an electrical conduit but may be any device which facilitates the passage of areas into compartment 14. A second vapor-impermeable seal 47 may be provided where fixture 40 enters compartment 14. In the illustrated embodiment, seal 47 is potting compound inserted directly in fixture 40. Fixture 40 additionally includes a slip joint 41 which facilitates installation of fixture 40 and seal 43. Although seals 43 and 47 are illustrated as potting compound, other seals may be used including foam seals, vacuum seals, preformed rubber seals, and the like.

In order to install fuel dispenser 10, the fuel dispenser 10 is positioned with opening 39 interconnecting with the underground conduit (not shown) which is typically prepositioned in concrete. Potting boot 44 may be prepositioned on conduit 40 or may be attached to conduit 40 in the field. Wires 38 are run unbroken from a central control station (not shown) of the fueling terminal through the underground conduit and, unbroken, through fixture 40 into control compartment 14. The wires are then terminated at the appropriate locations on terminal block 46 in order to connect with wires (not shown) already connected with terminal block 46 which service the electrical and electronic components in control compartment 14. After wires 38 are ran, potting boot 44 is filled with potting compound utilizing conventional techniques.

Figure 5:
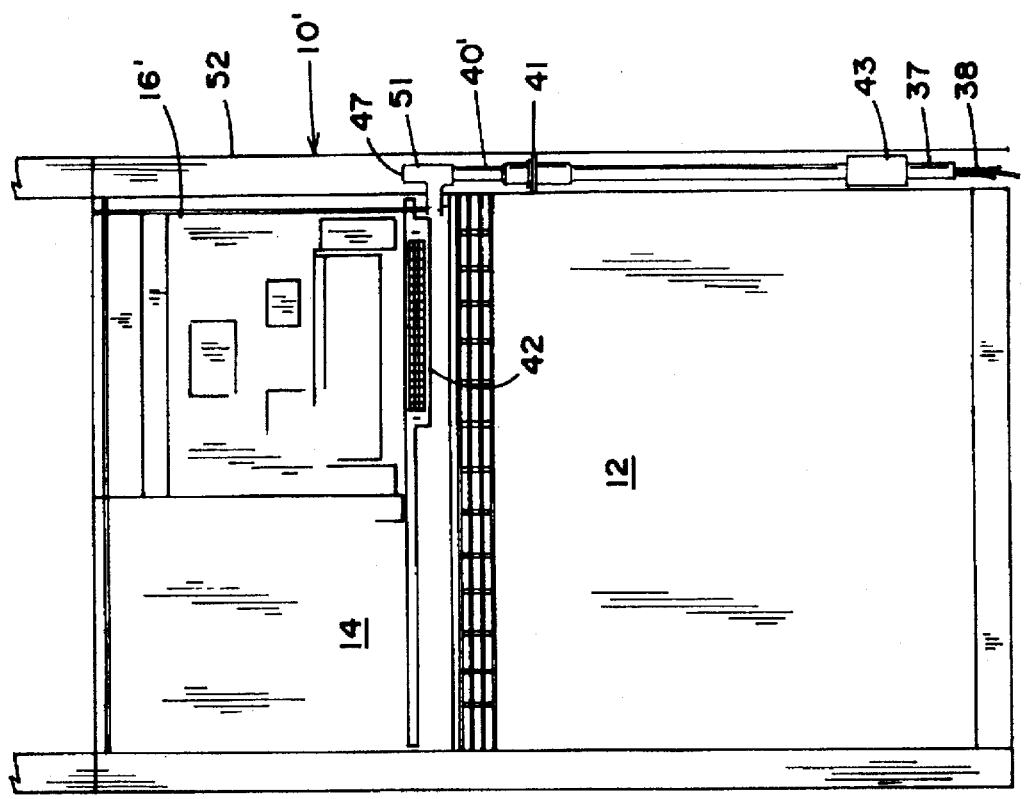
FIG. 5 is the same view as FIG. 2 of an alternative embodiment of the invention.

According to another embodiment of the invention, a fuel dispenser 10', including a fuel-handling compartment 12 and a control compartment 14. A fixture 40' extends through a compartment 52 which supports a top assembly 54 of the fuel dispenser (FIGS. 1 and 5). In this embodiment, fixture conduit 40' extends into compartment 14 through a vapor barrier 16' which is an impermeable membrane-type vapor barrier. A vapor-impermeable seal 43 is attached at a terminal portion 37 of fixture 40'. Wires 38 are run unbroken from a central control station (not shown) to terminal device 42 positioned in control compartment 14. If seal 43 includes a potting boot, potting compound is then applied to the potting booth. A second vapor-impermeable seal 47 may be provided as a T-fitting in which potting compound is inserted in one opening thereof. Because compartment 52 is interconnected with underground conduit, it is rated as Class 1, Division 1, environment. However, because of the presence of the seals 43 and 47, fuel vapors are prevented from entering control compartment 14 from compartment 52 through fixture 40' which, in the illustrated embodiment, is an electrical conduit. Fuel dispenser 10' is otherwise installed in substantially the same manner as fuel dispenser 10.

Thus, it is seen that the present invention provides a unique manner of eliminating a source of ignition of vapors within fuel-handling compartment 12. Accordingly, the required explosion-proof housing for such ignition source is, likewise, eliminated. This greatly reduces the cost and complexity of the fuel dispenser and increases safety by removing a potential source of ignition from fuel-handling compartment 12.

Changes and modifications in the specifically described embodiments can be carded out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A vehicle fuel dispenser, comprising:
   a housing having a compartment defined by a wall and electrical controls positioned in said compartment; and
   a wiring system including a terminal device in said compartment electrically connected with said controls, a fixture penetrating said wall and a vapor-impermeable seal on said fixture preventing fuel vapors from entering said compartment, whereby field-installed wires may be terminated at said terminal device and said terminal device does not have to be fuel hazard rated.

2. The fuel dispenser in claim 1 wherein said vapor-impermeable barrier is field installable.

3. The fuel dispenser in claim 2 wherein said vapor-impermeable barrier includes at least one of a potting compound, a foam seal, a vacuum seal and a preformed rubber.

4. The fuel dispenser in claim 3 including a second said vapor-impermeable seal in said fixture.

5. The fuel dispenser in claim 4 wherein said second vapor-impermeable seal includes one of potting compound, foam seal, vacuum seal or preformed rubber.

6. The fuel dispenser in claim 1 wherein said housing includes another compartment and wherein said fixture extends from said another compartment penetrating said wall.

7. The fuel dispenser in claim 6 including fuel-handling equipment in said another compartment.

8. The fuel dispenser in claim 7 wherein said fixture is an electrical conduit.

9. The fuel dispenser in claim 1 wherein said fixture is an electrical conduit.

10. A method of field-installing a fuel dispenser, including:
    providing a fuel dispenser having a housing, a compartment in said housing defined by a wall, electrical controls and a terminal device in said compartment, and a fixture penetrating said compartment wall;
    running unbroken electrical leads through said fixture;
    terminating said electrical leads with said terminal device; and
    sealing said fixture conduit against vapor transmission.

11. The method of claim 10 wherein said sealing includes applying a at least one of a potting compound, a foam seal, a vacuum seal or a preformed rubber to said fixture.

12. The method of claim 10 wherein said running unbroken electrical leads includes running said electrical leads through another compartment exposed to fuel vapors.

13. The method of claim 12 wherein said another compartment is separated from said compartment by a vapor barrier and said fixture extends between said compartments across said vapor barrier.

14. The method in claim 12 wherein said fixture includes an electrical conduit.

15. The method in claim 10 wherein said sealing said fixture includes applying a sealing component at two spaced apart locations on said fixture.

16. A fuel dispenser, comprising:

a control compartment, including electrical control equipment that is not fuel hazard rated, said electrical control equipment including electrical terminals for terminating electrical supply leads;

a fuel equipment compartment including fuel-handling equipment, wherein said fuel equipment compartment creates a fuel explosion risk;

a vapor barrier between said compartments; and a sealed electrical supply device extending into said control compartment from said fuel compartment, wherein field-installed electrical supply leads can pass through said fuel equipment compartment and terminated in said control compartment.

17. The fuel dispenser in claim 16 not having an electrical terminal device in said fuel equipment compartment.

18. The fuel dispenser in claim 17 wherein said sealed electrical supply device is sealed by field-installable vapor-impermeable seal.

19. The fuel dispenser in claim 16 wherein said electrical supply device is an electrical conduit.

20. The fuel dispenser in claim 16 wherein said vapor barrier includes a ventilated air gap between said compartments.

21. The fuel dispenser in claim 20 wherein said fuel equipment compartment is below said control compartment.

22. The fuel dispenser in claim 19 wherein said vapor barrier includes an impermeable membrane between said compartments.

23. The fuel dispenser in claim 18 wherein said field-installable vapor-impermeable seal includes at least one of a potting compound, a foam seal, a vacuum seal or a preformed rubber.

* * * * *